United States Patent
Matsuoka et al.

(10) Patent No.: US 10,068,480 B2
(45) Date of Patent: Sep. 4, 2018

(54) DRIVING SUPPORT APPARATUS

(71) Applicant: TOYOTA JIDOSHA KABUSHIKI KAISHA, Toyota-shi, Aichi (JP)

(72) Inventors: Katsuhiro Matsuoka, Nagakute (JP); Kazuhiro Morimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/235,648

(22) Filed: Aug. 12, 2016

(65) Prior Publication Data
US 2017/0084177 A1    Mar. 23, 2017

(30) Foreign Application Priority Data
Sep. 18, 2015 (JP) .................. 2015-184599

(51) Int. Cl.
*G06F 17/10* (2006.01)
*G06G 7/78* (2006.01)
(Continued)

(52) U.S. Cl.
CPC .............. *G08G 1/166* (2013.01); *B60W 30/09* (2013.01); *G08G 1/04* (2013.01); *G08G 1/096* (2013.01);
(Continued)

(58) Field of Classification Search
CPC ........ B60W 30/09; B60W 30/08; G08G 1/04; G08G 1/096; G08G 1/163; G08G 1/164;
(Continued)

(56) References Cited

U.S. PATENT DOCUMENTS 8,405,523 B2 * 3/2013 Yamada ................. G01C 21/26
340/916
8,508,386 B2 * 8/2013 Yamada ................. G08G 1/095
340/901
(Continued)

FOREIGN PATENT DOCUMENTS

| JP | 2000-168474 A | 6/2000 |
| JP | 2004-171459 A | 6/2004 |
| JP | 2010-39842 A  | 2/2010 |

*Primary Examiner* — Rachid Bendidi
(74) *Attorney, Agent, or Firm* — Oliff PLC

(57) ABSTRACT

When an own vehicle is highly likely to collide with an obstacle, a notification of prompting a driver to carry out a collision avoidance operation is appropriately given. When an output request for collision avoidance support information exists, a notification ECU notifies of the collision avoidance support information irrespective of absence/presence of an output request for vehicle-infrastructure cooperation support information. When the output request for the collision avoidance support information does not exist and the output request for the vehicle-infrastructure cooperation support information exists, the notification ECU notifies of the vehicle-infrastructure cooperation support information. Thus, when the conditions for the notification of the vehicle-infrastructure cooperation support information and the collision avoidance support information are simultaneously satisfied, the vehicle-infrastructure cooperation support information is inhibited from being notified and the collision avoidance support information is notified.

4 Claims, 7 Drawing Sheets

(51) Int. Cl.
*G08G 1/16* (2006.01)
*B60W 30/09* (2012.01)
*G08G 1/04* (2006.01)
*G08G 1/096* (2006.01)
*G08G 1/0967* (2006.01)

(52) U.S. Cl.
CPC . *G08G 1/096716* (2013.01); *G08G 1/096725* (2013.01); *G08G 1/096758* (2013.01); *G08G 1/096783* (2013.01); *G08G 1/096791* (2013.01); *G08G 1/163* (2013.01); *G08G 1/164* (2013.01)

(58) Field of Classification Search
CPC ............. G08G 1/166; G08G 1/096716; G08G 1/096725; G08G 1/096758; G08G 1/096783; G08G 1/096791; G08G 1/165

See application file for complete search history.

(56) References Cited

U.S. PATENT DOCUMENTS

| | | | | |
|---|---|---|---|---|
| 8,558,719 | B2* | 10/2013 | Yamada | G08G 1/0962 340/901 |
| 8,581,746 | B2* | 11/2013 | Yamada | G01C 21/26 340/917 |
| 8,643,506 | B2* | 2/2014 | Yamada | G08G 1/095 340/901 |
| 8,892,342 | B2* | 11/2014 | Yamada | G08G 1/096716 340/929 |
| 2005/0046584 | A1* | 3/2005 | Breed | B60C 11/24 340/13.31 |
| 2007/0080825 | A1* | 4/2007 | Shiller | B60R 21/013 340/903 |
| 2007/0112516 | A1* | 5/2007 | Taniguchi | B60R 21/0134 701/301 |
| 2008/0189040 | A1* | 8/2008 | Nasu | G08G 1/163 701/301 |
| 2010/0188200 | A1* | 7/2010 | Hashimoto | B60W 50/14 340/435 |
| 2010/0217483 | A1* | 8/2010 | Matsuno | G08G 1/165 701/36 |
| 2013/0253754 | A1* | 9/2013 | Ferguson | G05D 1/0231 701/28 |

* cited by examiner

DRIVING SUPPORT APPARATUS

BACKGROUND OF THE INVENTION

1. Field of the Invention

The present invention relates to a driving support apparatus configured to receive externally transmitted information transmitted from a communication device external to an own vehicle, and to give a notification for driving support to a driver based on the externally transmitted information and own vehicle information.

2. Description of the Related Art

Hitherto, there has been known a driving support apparatus configured to receive externally transmitted information, which is information transmitted from a roadside device, and to support driving of the driver based on the externally transmitted information and own vehicle information. For example, in a driving support apparatus proposed in Japanese Patent Application Laid-open No. 2004-171459, traffic light information transmitted from a traffic light is received by an in-vehicle communication device. The traffic light information includes information on a lighting state and a lighting period of the traffic light. The driving support apparatus is configured to calculate a period until the lighting state of the traffic light changes based on the traffic light information when the own vehicle is located near the traffic light, and to display this period on a display device. As a result, the driver can drive while recognizing the period until the lighting state of the traffic light changes.

The system configured to use the in-vehicle communication device to receive the externally transmitted information transmitted from the roadside device, and to use the information for the driving support for the driver in this way is referred to as vehicle-infrastructure cooperative system. The externally transmitted information transmitted from the roadside device includes vehicle detection information on vehicles detected in a vicinity of an intersection and the traffic light information on lighting of a traffic light.

The driving support apparatus is configured to operate a notification device so as to give a notification for the driving support when a support condition for providing a service for the driving support to the driver is satisfied based on the externally transmitted information and own vehicle information (information representing a position and a driving state of the own vehicle). For example, the driving support apparatus estimates whether the driver overlooks a red traffic signal based on the traffic light information and the own vehicle information. The driving support apparatus is configured to sound a buzzer, and to display characters, "Caution: Red Signal", a symbol, and the like on a screen of the display device when such a condition that the driver is supposed to have overlooked a red traffic signal is satisfied. This can cause the driver to pay attention to the traffic light.

Incidentally, a collision avoidance support system is known as one of the driving support apparatus independently of the vehicle-infrastructure cooperative system. The collision avoidance support system is configured to detect an obstacle ahead of the own vehicle through a sensor, e.g., a radar, installed on the own vehicle, determine that the support condition is satisfied when such a condition that the own vehicle is highly likely to collide with the obstacle is satisfied, and prompt the driver to carry out a collision avoidance operation through the display device and the buzzer.

However, when both the vehicle-infrastructure cooperative system and the collision avoidance support system are installed on the vehicle, the following problem occurs. For example, the support condition determined by the vehicle-infrastructure cooperative system and the support condition determined by the collision avoidance support system may be simultaneously satisfied. In this case, when the support information provided by the vehicle-infrastructure cooperative system and the support information provided by the collision avoidance support system are simultaneously displayed, the driver has difficulty in instantaneously determining an action to take.

The support information provided by the collision avoidance support system is information released when the state in which the own vehicle collides with an obstacle is imminent, and is an alarm of instructing the driver to immediately carry out the collision avoidance operation, e.g., a brake operation.

On the other hand, the support information provided by the vehicle-infrastructure cooperative system is information of notifying the driver of the state to which the driver needs to pay attention at an intersection, and is different from the information of strongly prompting the drive to take an action.

Thus, when the support information by the vehicle-infrastructure cooperative system and the support information by the collision avoidance support system are simultaneously provided, the information (instruction of prompting the collision avoidance operation, e.g., the brake operation) that needs to be notified to the driver may not be appropriately transmitted to the driver.

SUMMARY OF THE INVENTION

The present invention has been made in view of the above-mentioned problem, and therefore has an object to enable, when an own vehicle is highly likely to collide with an obstacle, a notification of prompting a driver to carry out a collision avoidance operation to be appropriately given.

In order to achieve the above-mentioned object, a feature of one embodiment of the present invention resides in a driving support apparatus, including:

externally transmitted information acquisition means for acquiring externally transmitted information transmitted from a communication device external to an own vehicle, the externally transmitted information including at least one of vehicle detection information on another vehicle detected in a vicinity of the own vehicle, or traffic light information on lighting of a traffic light installed in the vicinity of the own vehicle;

own vehicle information acquisition means for acquiring own vehicle information representing a position and a driving state of the own vehicle;

first notification means for giving a notification for driving support when a first condition, which is a condition based on the externally transmitted information and the own vehicle information, and is a condition that necessitates provision of the driving support for a driver, is satisfied;

obstacle detection means installed on the own vehicle, for detecting an obstacle existing at least ahead of the own vehicle;

second notification means for giving a notification of prompting the driver to carry out a collision avoidance operation when a second condition that the own vehicle is highly likely to collide with the detected obstacle is satisfied; and arbitration means for inhibiting the notification by the first notification means and causing the second notification means to give the notification when the first condition and the second condition are simultaneously satisfied.

According to the one embodiment of the present invention, the externally transmitted information acquisition means is configured to acquire the externally transmitted information including at least one of the vehicle detection information on another vehicle detected in the vicinity of the own vehicle, or the traffic light information on the lighting of the traffic light installed in the vicinity of the own vehicle. The vehicle detection information is, for example, information representing positions of other vehicles on a road map, and information representing vehicle speeds of the other vehicles. The traffic light information is, for example, information that can be used to identify a period in which the traffic light is red (or green).

The own vehicle information acquisition means is configured to acquire the own vehicle information representing the position of the own vehicle (position of the own vehicle on the road map) and the driving state of the own vehicle. The driving state represents, for example, the vehicle speed, and driving operation amounts of the driver.

The first notification means is configured to give the notification for driving support when the first condition, which is the condition based on the externally transmitted information and the own vehicle information, and is the condition that necessitates provision of the driving support for the driver, is satisfied. Thus, the driver can appropriately drive the own vehicle based on the notification for the driving support.

The obstacle detection means is installed on the own vehicle, and is configured to detect the obstacle existing at least ahead of the own vehicle. The second notification means is configured to give the notification of prompting the driver to carry out the collision avoidance operation when the second condition that the own vehicle is highly likely to collide with the detected obstacle is satisfied. For example, when the own vehicle travels while maintaining the current driving state, and a time to collision, which is an estimated period until the own vehicle collides with the obstacle, is equal to or less than a threshold period, the second condition is satisfied. Alternatively, for example, when a distance between the own vehicle and the obstacle is equal to or less than a threshold distance, the second condition is satisfied. Thus, the driver can carry out the collision avoidance operation (e.g., a brake operation) in response to the notification of prompting the collision avoidance operation.

The arbitration means is configured to inhibit the notification by the first notification means and cause the second notification means to give the notification when the first condition and the second condition are simultaneously satisfied. Thus, when an own vehicle is highly likely to collide with an obstacle, the notification of prompting the driver to carry out the collision avoidance operation is appropriately given. As a result, the driver can appropriately carry out the collision avoidance operation in accordance with the notification by the second notification means without interference by the notification by the first notification means.

For example, the arbitration means is configured to cause the second notification means to give the notification and inhibit the notification by the first notification means irrespective of whether the first condition is satisfied when the second condition is satisfied. As a result, the notification by the first notification means can be inhibited, and the notification by the second notification means can be given when the first condition and the second condition are simultaneously satisfied.

According to a feature of one aspect of the present invention, the arbitration means may be configured to, when the second condition is satisfied under a state in which the first condition is satisfied before the second condition, stop the notification by the first notification means when the second condition is satisfied, and cause the second notification means to start the notification.

Further, the arbitration means may be configured to, when the first condition is satisfied under a state in which the second condition is satisfied before the first condition, cause the second notification means to continue the notification and inhibit the first notification means from starting the notification.

According to the one aspect of the present invention, when the first condition and the second conditions are simultaneously satisfied, the notification by the first notification means can be reliably inhibited. Therefore, the notification of prompting the driver to carry out the collision avoidance operation can be appropriately given.

In the above description, a reference numeral used in an embodiment of the present invention is enclosed in parentheses and is assigned to each of the constituent features of the invention corresponding to the embodiment in order to facilitate understanding of the invention. However, each of the constituent features of the invention is not limited to the embodiment defined by the reference numeral.

DETAILED DESCRIPTION OF THE PREFERRED EMBODIMENTS

Figure 1:
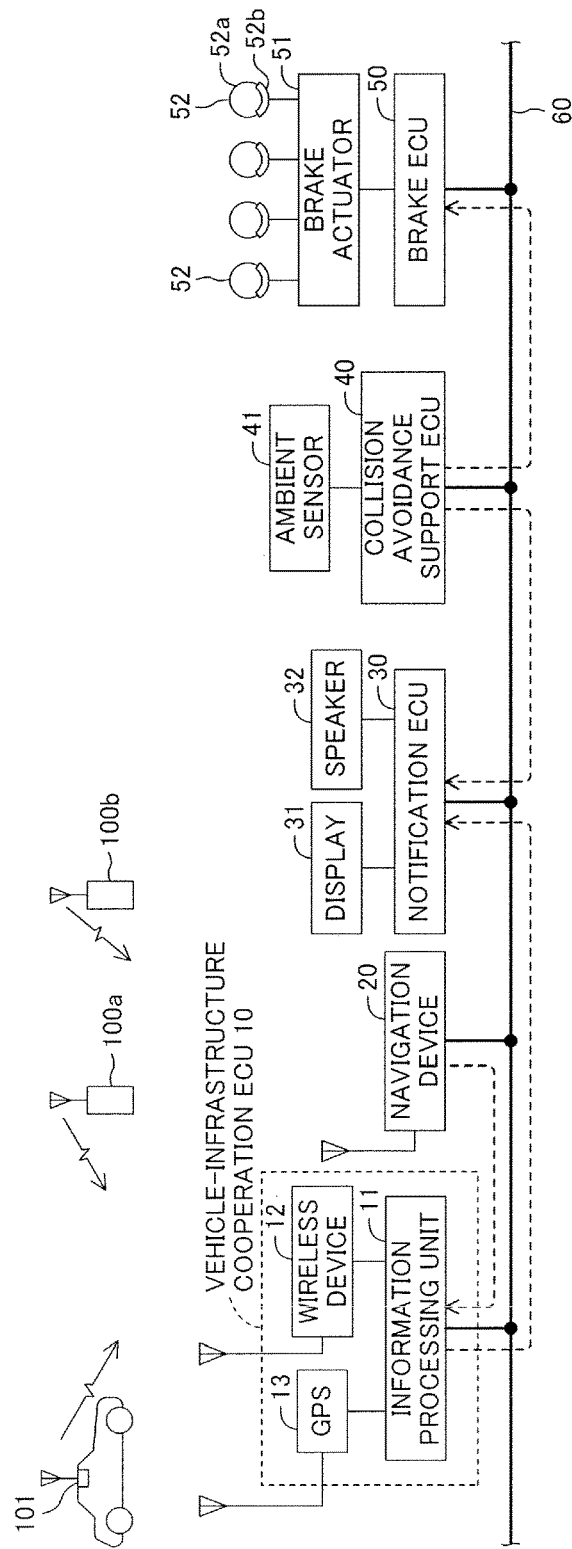
FIG. 1 is a schematic system diagram for illustrating a driving support apparatus according to an embodiment of the present invention.

Referring to the accompanying drawings, an embodiment of the present invention is described in detail below. FIG. 1 is a schematic system configuration diagram for illustrating a driving support apparatus according to this embodiment.

The driving support apparatus is an in-vehicle apparatus, and includes a vehicle-infrastructure cooperation ECU 10, a navigation device 20, a notification ECU 30, a collision avoidance support ECU 40, and a brake ECU 50. The vehicle-infrastructure cooperation ECU 10, the navigation device 20, the notification ECU 30, the collision avoidance support ECU 40, and the brake ECU 50 are connected to one another via an in-vehicle LAN 60 for mutual transmission/ reception. "ECU" is an abbreviation for electronic control unit. The ECU includes a microcomputer. A vehicle on which the driving support apparatus is installed is herein referred to as "own vehicle".

The vehicle-infrastructure cooperation ECU 10 includes an information processing unit 11, a radio wave media wireless device 12, and a GPS receiver 13. The radio wave media wireless device 12 is a device configured to wirelessly receive infrastructure information transmitted from a radio wave roadside device 100a installed on the road. The radio wave roadside device 100a is a road-to-vehicle communication device, e.g., a radio wave beacon, installed on a roadside of an intersection subject to be serviced and the like. The radio wave media wireless device 12 includes a function of carrying out mutual wireless communication to/from a vehicle-to-vehicle communication device 101 installed on another vehicle, thereby acquiring other vehicle information notified by another vehicle in addition to the function of reception from the radio wave roadside device 100a. The radio wave media wireless device 12 is configured to output the received infrastructure information (including the other vehicle information) to the information processing unit 11.

The GPS receiver 13 receives a GPS signal, which is distributed by the GPS satellite to be used for acquiring position information (latitude and longitude) of the own vehicle. The GPS receiver 13 outputs the received GPS signal to the information processing unit 11.

The information processing unit 11 includes a microcomputer as a main component. The information processing unit 11 is configured to acquire driving state information (such as a vehicle speed, a travel direction, and driving operation amounts (such as an accelerator pedal operation amount, a brake pedal operation amount, and a steering wheel operation amount)) on the own vehicle transmitted via the in-vehicle LAN 60. Moreover, the information processing unit 11 is configured to acquire the position information on the own vehicle from the GPS receiver 13. The microcomputer herein includes a CPU and storage devices such as a ROM and a RAM, and the CPU is configured to implement various functions by executing instructions (programs) stored in the ROM.

The navigation device 20 includes a function of receiving infrastructure information transmitted from an optical beacon roadside device 100b in addition to a function of detecting the position and the travel direction of the own vehicle and guiding the own vehicle through a travel route to a destination. The navigation device 20 is configured to use the infrastructure information for the travel route guidance, and to transmit the infrastructure information to the information processing unit 11 of the vehicle-infrastructure cooperation ECU 10 via the in-vehicle LAN 60. The radio wave roadside device 100a and the optical beacon roadside device 100b are hereinafter generally referred to as roadside device 100.

The information processing unit 11 is configured to acquire the infrastructure information from the radio wave media wireless device 12 and the navigation device 20. The information processing unit 11 is configured to generate driving support information, which is information for supporting the driving of the driver based on the position information on the own vehicle, the driving state information on the own vehicle, and the infrastructure information. The information processing unit 11 is configured to transmit the generated driving support information to the notification ECU 30.

The infrastructure information corresponds to externally transmitted information according to the present invention. The infrastructure information includes intersection information, road information, construction/traffic regulation information, traffic jam information, and emergency vehicle information.

The intersection information includes traffic light information at an intersection (intersection to be serviced) at which the roadside device 100 is installed, vehicle detection information on vehicles detected in a vicinity (predetermined range of a distance from a center of the intersection) of the intersection, pedestrian detection information on pedestrians detected in the vicinity of the intersection, and intersection map information representing the intersection and shapes of roads connected to the intersection. The vehicle detection information and the pedestrian detection information are transmitted in real time from the roadside device 100.

The traffic light information includes information that can be used to identify the period in which the traffic light is red (or green) based on a lighting cycle and lighting periods of the green, yellow, and red traffic signals of the traffic light at an intersection to be serviced. Moreover, the vehicle detection information includes the position information and the vehicle speed information on vehicles detected on roads in the vicinity of the intersection. The pedestrian information includes position information on pedestrians and bicycles detected on the roads in the vicinity of the intersection. The vehicles, the pedestrians, the bicycles, and the like existing in the vicinity of the intersection are detected by camera sensors connected to the roadside devices 100. The position of the vehicle is represented by information for identifying a distance from a reference position of the intersection to the vehicle, and a road on which the vehicle exists. The same holds true for the positions of the pedestrians and the bicycles. The intersection map information includes information representing the reference position of the intersection, road number information for identifying the connected roads connected to the intersection, information for representing shapes (positions) of the intersection and the connected roads, and information for representing stop line positions of the respective connected roads.

The roadside device 100 is configured to transmit infrastructure information on a vicinity of the roadside device 100, for example, in a range within a predetermined radius (e.g., 300 m) about the roadside device 100. Thus, when the own vehicle enters a transmission range of the roadside device 100, the vehicle-infrastructure cooperation ECU 10 can receive the infrastructure information. As a result, the infrastructure cooperation ECU 10 can acquire the vehicle detection information on vehicles detected in a vicinity of the own vehicle, the pedestrian information on pedestrians (bicycles) detected in the vicinity of the own vehicle, the traffic light information on traffic lights installed in the vicinity of the own vehicle, and intersection map information in the vicinity of the own vehicle. The vehicle detection information includes the detection information both on the own vehicle and the other vehicles, but the detection information on the own vehicle and the detection information on the other vehicles can be distinguished from each other based on the position of the own vehicle detected by the GPS receiver 13. Thus, the vehicle-infrastructure cooperation ECU 10 can acquire the vehicle detection information on the other vehicles detected in the vicinity of the own vehicle.

The information processing unit 11 is configured to determine whether the driving by the driver needs to be supported based on the infrastructure information and the own vehicle information (the position information and the driving state information). The information processing unit 11 is configured to generate driving support information for supporting the driving by the driver when the information processing unit 11 determines that the driving needs to be supported. The information processing unit 11 is configured to transmit an output request for the generated driving support information to the notification ECU 30. This driving support information generated by the information processing unit 11 is hereinafter referred to as vehicle-infrastructure cooperation support information. The vehicle-infrastructure cooperation support information is information provided for (notified to) the driver.

As the vehicle-infrastructure cooperation support information provided for the driver, a plurality of types of information are prepared, such as red traffic signal overlook caution information, temporary stop overlook caution information, right turn caution information, stopped preceding vehicle existence notification information, side road vehicle existence notification information, ecological driving support information, emergency vehicle approach notification information, and start preparation information.

In the information processing unit 11, an application for providing the vehicle-infrastructure cooperation support information is installed. This application does not always need to include a function of providing all the above-mentioned types of the vehicle-infrastructure cooperation support information, and only needs to include a function of providing at least one type of the vehicle-infrastructure cooperation support information.

For example, the information processing unit 11 stores an overlook determination map in which a relationship between a distance from the own vehicle to a stop line at an intersection and an overlook determination vehicle speed is set. The overlook determination map has such a characteristic as to set the overlook determination vehicle speed that decreases as the distance to the stop line decreases. The information processing unit 11 is configured to determine that the driver may be overlooking the red traffic signal when the vehicle speed of the own vehicle is more than the overlook determination vehicle speed under a state in which the traffic light in the intersection toward which the own vehicle is traveling is red, and the accelerator pedal is depressed (notification condition is satisfied). In this case, the information processing unit 11 transmits the red traffic signal overlook caution information to the notification ECU 30.

For example, the information processing unit 11 stores an overlook determination map in which a relationship between the distance from the own vehicle to a temporary stop line and an overlook determination vehicle speed is set. The overlook determination map has such a characteristic as to set the overlook determination vehicle speed that decreases as the distance to the stop line decreases. The information processing unit 11 is configured to determine that the driver may be overlooking a temporary stop sign when the vehicle speed of the own vehicle is more than the overlook determination vehicle speed under a state in which the temporary stop line exists ahead of the vehicle, and the accelerator pedal is depressed (notification condition is satisfied). In this case, the information processing unit 11 is configured to transmit the temporary stop overlook caution information to the notification ECU 30.

For example, the information processing unit 11 is configured to calculate, when an oncoming vehicle traveling toward the intersection from the direction opposite to that of the own vehicle is detected under a state in which the own vehicle is turning right at the intersection, an arrival period until the oncoming vehicle arrives at the reference position of the intersection. The information processing unit 11 is configured to transmit the right turn caution information to the notification ECU 30 as information for notifying the driver of the existence of an oncoming vehicle when an oncoming vehicle having a shorter oncoming vehicle determination period than the arrival period exists (notification condition is satisfied). Alternatively, the information processing unit 11 is configured to transmit the right turn caution information to the notification ECU 30 as information for notifying the driver of the existence of a pedestrian when the pedestrian is detected on a pedestrian crossing in a right turn direction under a state in which the own vehicle is turning right at an intersection (notification condition is satisfied). The driving support apparatus according to this embodiment is applied to a country in which the vehicles are regulated to travel on the left side of the road. Thus, for the driving support apparatus applied to a country in which the vehicles are regulated to travel on the right side of the road, the left and right sides only need to be considered in reverse.

For example, the information processing unit 11 is configured to transmit to the notification ECU 30 the stopped preceding vehicle existence notification information as information for notifying existence of stopped vehicles in a line when a line of other stopped vehicles are detected in a travel lane of the own vehicle and ahead of the own vehicle (ahead in the travel direction) (notification condition is satisfied).

For example, the information processing unit 11 is configured to transmit the side road vehicle existence notification information to the notification ECU 30 as information for notifying existence of other vehicles when a side road is connected ahead of the road on which the own vehicle is traveling, and other vehicles exist on the side road (notification condition is satisfied).

For example, the information processing unit 11 is configured to transmit the ecological driving support information to the notification ECU 30 as information for instructing an early release timing of the accelerator pedal so that ecological driving is implemented when the traffic light of the intersection toward which the own vehicle is traveling is predicted to turn red (notification condition is satisfied).

For example, the information processing unit 11 is configured to transmit the emergency vehicle approach notification information to the notification ECU 30 as information for notifying existence of an emergency vehicle (e.g., ambulance car) when the information processing unit 11 detects a state in which an emergency vehicle is approaching the own vehicle (notification condition is satisfied).

For example, the information processing unit 11 is configured to transmit the start preparation information to the notification ECU 30 as information for representing a waiting period until the traffic light turns green when the own vehicle is stopped on the red traffic signal (notification condition is satisfied).

In this way, the information processing unit 11 is configured to recognize the state of the own vehicle in the vicinity of the intersection based on the infrastructure information and the own vehicle information, and to transmit the output request for the vehicle-infrastructure cooperation support information to the notification ECU 30 when the notification condition (corresponding to a first condition of the present invention) set to a piece of the vehicle-infrastructure cooperation support information is satisfied. The output request for the vehicle-infrastructure cooperation support information includes the vehicle-infrastructure cooperation support information.

The notification ECU 30 is a control device configured to provide the driving support information to the driver. The notification ECU 30 is connected to the display 31 and the speaker 32. The notification ECU 30 includes a drive device configured to drive a display 31 and a speaker 32, and a microcomputer configured to control an operation of the drive device as main components. The notification ECU 30 is configured to receive the output request for the vehicle-infrastructure cooperation support information transmitted from the vehicle-infrastructure cooperation ECU 10 (information processing unit 11) via the in-vehicle LAN 60. When the notification ECU 30 receives the output request for the vehicle-infrastructure cooperation support information, the notification ECU 30 sounds the speaker 32 to output a buzzer sound, and displays the vehicle-infrastructure cooperation support information on the display 31 in a display form set corresponding to the vehicle-infrastructure cooperation support information.

The display 31 is installed at a position visually recognizable by the driver during the driving, and is configured to use characters and graphics to display the vehicle-infrastructure cooperation support information. As the display 31, for example, a meter display panel configured to display various types of meters, a head-up display configured to display images on a windshield, or a hybrid system indicator in a case of a hybrid vehicle can be used.

For example, when the vehicle infrastructure cooperation support information is the red traffic signal overlook caution information, the notification ECU 30 displays such characters as "Caution: Red Traffic Signal" on the display 31. For example, when the vehicle-infrastructure cooperation support information is the start preparation information, the notification ECU 30 displays a wait period in numerical characters until the traffic light turns green on the display 31. For example, when the vehicle-infrastructure cooperation support information is the right turn caution information, the notification ECU 30 displays a map of the intersection on the display 31, and displays the positions of the oncoming vehicles and the positions of the pedestrians as marks or the like on the map. Alternatively, characters such as "Caution: Oncoming Vehicles" and "Caution: Pedestrians" may be displayed on the display 31.

This display on the display 31 can allow the driver to recognize a driving action to take. The buzzer sound is such a guide sound as to cause the driver to notice the display on the display 31. Thus, the vehicle-infrastructure cooperative support information is provided (notified) through the display on the display 31.

A description is now given of the collision avoidance support ECU 40. The collision avoidance support ECU 40 is a control device configured to support the driving of the driver so as to avoid a collision of the own vehicle with an obstacle. The collision avoidance support ECU 40 is connected to an ambient sensor 41. The ambient sensor 41 is fixed to a vehicle body of the own vehicle, and has a function of acquiring information on obstacles (3D objects) existing ahead of the own vehicle. The obstacles include moving objects such as the pedestrians, bicycles, and motor vehicles, and fixed objects such as electric poles, trees, and guard rails.

The ambient sensor 41 includes, for example, a radar sensor. The radar sensor is configured, for example, to radiate a radio wave in the millimeter waveband ahead of the own vehicle, and when an obstacle exists, receive a reflected wave from the obstacle to calculate presence/absence of an obstacle, and relative relationships (such as a distance between the own vehicle and the obstacle, and a relative speed between the own vehicle and the obstacle) between the own vehicle and the obstacle based on a radiation timing and a received timing of the radio wave. The ambient sensor 41 is not limited to the radar sensor, and may include, for example, a camera sensor. The camera sensor includes, for example, a stereo camera, and is configured to use the stereo camera to image left and right scenes ahead of the vehicle, and to calculate the absence/presence of obstacles, and the relative relationships between the own vehicle and the obstacles based on the taken left and right image data. The ambient sensor 41 transmits a calculation result to the collision avoidance support ECU 40.

The collision avoidance support ECU 40 includes a microcomputer as a main component. The collision avoidance support ECU 40 is configured to calculate a time to collision TTC, which is an estimated period (remaining period until the collision) until the collision of the own vehicle with the obstacle, in accordance with Equation (1) based on a distance L between the obstacle detected by the ambient sensor 41 and the own vehicle, and a relative speed Vr between the own vehicle and the obstacle.

$$TTC=L/Vr \tag{1}$$

The time to collision TTC serves as an index representing a possibility of the collision of the own vehicle with the obstacle. As the time to collision TTC decreases, the possibility of the collision of the own vehicle with the obstacle can be determined to increase (degree of emergency can be determined to increase).

The collision avoidance support ECU 40 stores an alarm threshold period T1 and an automatic brake threshold period T2, and is configured to compare the time to collision TTC with those two threshold periods T1 and T2. The automatic brake threshold period T2 is set to a period shorter than the alarm threshold period T1. The collision avoidance support ECU 40 is configured to set a control mode to a no support mode when the time to collision TTC is more than the alarm threshold period T1, and not to provide the information (collision avoidance support information) for supporting the collision avoidance of the driver.

Moreover, the collision avoidance support ECU 40 is configured to set the control mode to an alarm mode when the collision avoidance support ECU 40 determines that such an alarm condition (TTC≤T1) that the time to collision TTC is equal to or less than the alarm threshold period T1 is satisfied. The alarm condition (TTC≤T1) corresponds to a second condition of the present invention. This alarm condition is set to be satisfied when the possibility that the own vehicle collides with an obstacle becomes high. Therefore, the collision avoidance support ECU 40 is configured to transmit an output request for the collision avoidance support information, which is information of prompting the driver to carry out the collision avoidance operation (brake pedal depression operation), to the notification ECU 30. The collision avoidance support information is one type of information for supporting the driving of the driver, but is different from the vehicle-infrastructure cooperation support information.

The collision avoidance support ECU 40 is configured to determine that the automatic brake condition is satisfied when the time to collision TTC is equal to or less than an automatic brake threshold period T2 (TTC≤T2), and to set the control mode to an automatic brake mode. The collision avoidance support ECU 40 is configured to calculate a required collision avoidance deceleration Gb*, and transmit an automatic brake command representing the calculated required collision avoidance deceleration Gb* to the brake ECU 50 in the automatic brake mode. The collision avoidance support ECU 40 is configured to transmit the output request for the collision avoidance support information to the notification ECU 30 also in the automatic brake mode as in the alarm mode.

The required collision avoidance deceleration Gb* can be calculated as follows. For example, assuming that an obstacle is stationary, a travel distance X until the own vehicle stops is represented by Equation (2), where, at the current time point, the speed (=relative speed) of the own vehicle is V, the deceleration of the own vehicle is a, and a period until the vehicle stops is t.

$$X = V \cdot t + (1/2) \cdot a \cdot t^2 \quad (2)$$

Moreover, the period t until the vehicle stops can be represented by Equation (3).

$$t = -V/A \quad (3)$$

Thus, the travel distance X until the own vehicle stops can be represented by Equation (4) by assigning Equation (3) to Equation (2).

$$X = -V^2/2a \quad (4)$$

In order to stop the vehicle before the obstacle by a distance β, the travel distance X only needs to be set to a distance (L-β) acquired by subtracting the distance β from the distance L detected by the ambient sensor 41, to thereby calculate the deceleration a (Gb*). When the obstacle is traveling, a relative speed and a relative deceleration with respect to the obstacle only need to be used to calculate the deceleration a (Gb*).

The brake ECU 50 is a control device configured to control braking forces to be generated on wheels. The brake ECU 50 is connected to the brake actuator 51. The brake actuator 51 is connected to friction brake mechanisms 52 provided for respective wheels via hydraulic pipes. The friction brake mechanism 52 is constructed by a brake disk 52a rotating along with the wheel, and a brake caliper 52b fixed to a vehicle body. The brake actuator 51 is provided between a master cylinder and the friction brake mechanism 52, and includes, for example, control valves each configured to adjust a hydraulic pressure supplied to a wheel cylinder provided in the brake caliper 52b of the friction brake mechanism 52, a booster pump, an accumulator, and a hydraulic pressure sensor configured to detect a hydraulic pressure in a hydraulic pressure circuit.

The brake ECU 50 includes a microcomputer as a main component, and is configured to control an operation of the brake actuator 51 so as to acquire the required deceleration. Moreover, the brake ECU 50 is connected to a brake sensor configured to detect a brake pedal operation amount, and wheel speed sensors configured to detect respective wheel speeds of the front/rear left/right wheels, which are not shown. The brake ECU 50 is configured to calculate the vehicle speed based on the wheel speeds of the respective wheels detected by the wheel speed sensors, and provide vehicle speed information to other in-vehicle ECUs via the in-vehicle LAN 60. Moreover, the brake ECU 50 provides brake operation amount information representing the brake pedal operation amount to other in-vehicle ECUs via the in-vehicle LAN 60.

The brake ECU 50 is configured to control an operation of the brake actuator 51 so as to acquire the required collision avoidance deceleration Gb* when the brake ECU 50 inputs the automatic brake command representing the required collision avoidance deceleration Gb* transmitted from the collision avoidance support ECU 40. As a result, the braking forces are applied to the wheels by the friction brake mechanisms 52, and the own vehicle is decelerated at the required collision avoidance deceleration Gb*.

The notification ECU 30 is configured to sound the buzzer sound from the speaker 32, and display an alarm indication on the display 31 when the notification ECU 30 receives the output request for the collision avoidance support information transmitted from the collision avoidance support ECU 40 via the in-vehicle LAN 60. The alarm indication instructs the driver to immediately depress the brake pedal. For example, "Brake!!" is displayed on the display 31. The driver is alerted by the alarm indication, and immediately depresses the brake pedal. As a result, the own vehicle can avoid the collision with the obstacle. The display on the display 31 is a display for causing the driver to carry out the collision avoidance operation, and may be, in place of the instruction for the depression operation on the brake pedal, a display (e.g., "Caution: Collision") representing that the current state is the state in which the possibility of the collision with the obstacle is high.

As described above, the notification ECU 30 is configured to receive the vehicle-infrastructure cooperation support information transmitted from the vehicle-infrastructure cooperation ECU 10 and the collision avoidance support information transmitted from the collision avoidance support ECU 40, and to display the received support information on the display 31. Thus, the display 31 is used as means for notifying the driver of both of the vehicle-infrastructure cooperation support information and the collision avoidance support information.

When the output request for the vehicle-infrastructure cooperation support information and the output request for the collision avoidance support information are simultaneously transmitted to the notification ECU 30, and the two pieces of the support information are simultaneously displayed on the display 31, the driver has difficulty in determining an action to take from the two pieces of the support information. Moreover, areas for the display respectively decrease on a limited display region of the display 31, and thus visibility for the driver and information communication performance to the driver deteriorate.

The collision avoidance support information is information to be notified under the state in which the own vehicle is highly likely to collide with an obstacle. When this information is notified, the driver immediately needs to carry out the instructed collision avoidance operation such as depressing the brake pedal or performing steering. On the other hand, the vehicle-infrastructure cooperation support information is information for notifying to the driver that the current state is a state in which the driver needs to pay attention to an intersection (e.g., an oncoming vehicle), and how to behave in response to the information depends on the driver. Moreover, the emergency of vehicle-infrastructure cooperation support information is low compared with the collision avoidance support information.

Thus, according to this embodiment, the notification ECU 30 is configured to prioritize the notification of the collision avoidance support information, and not to notify of the vehicle-infrastructure cooperation support information when the notification ECU 30 has received the output request for the collision avoidance support information from the collision avoidance support ECU 40.

Figure 2:
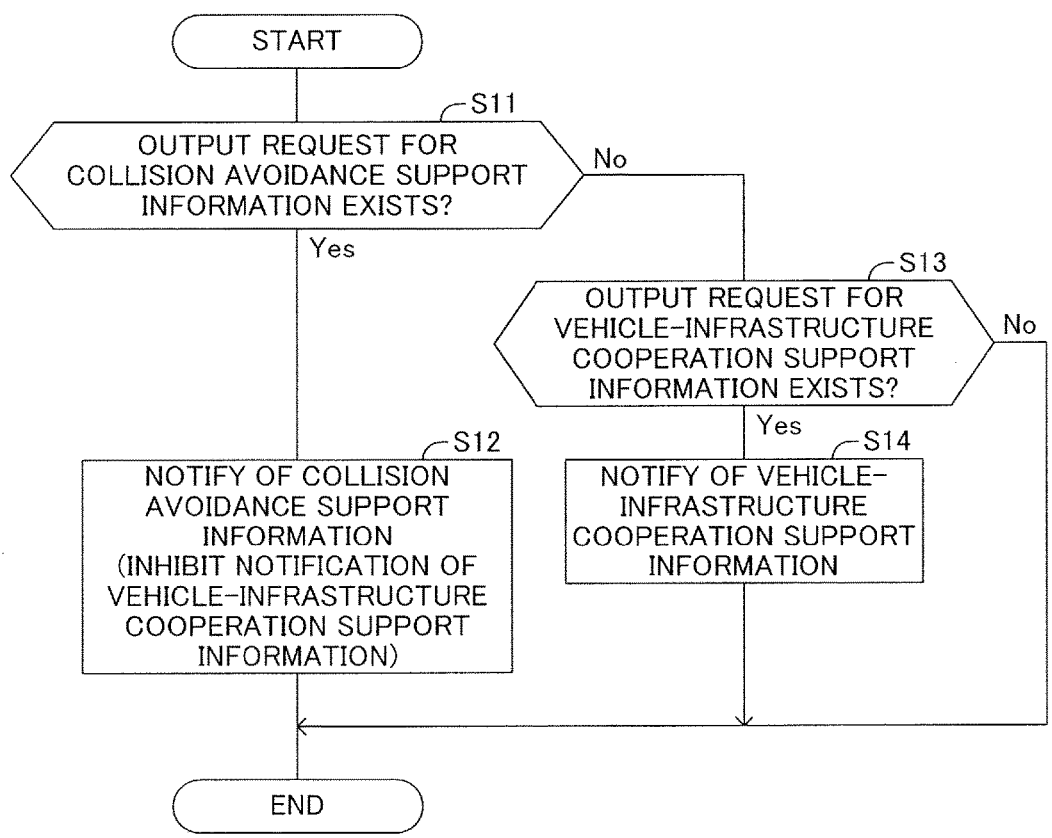
FIG. 2 is a flowchart for illustrating a notification arbitration control routine.

FIG. 2 is a flowchart for illustrating a notification arbitration control routine to be executed by the notification ECU 30. The notification ECU 30 is configured to repeat the execution of the notification arbitration control routine at a predetermined calculation cycle in a period in which an ignition switch is turned on.

When this routine is started, in Step S11, the notification ECU 30 determines whether the output request for the collision avoidance support information exists. In this case, the notification ECU 30 determines whether the output request for the collision avoidance support information has been received. When the output request for the collision avoidance support information exists, in Step S12, the notification ECU 30 sounds the buzzer sound from the speaker 32, displays the collision avoidance support information on the display 31, and once finishes this routine. This routine is repeated at the predetermined calculation cycle, and thus the collision avoidance support information (only the collision avoidance support information) is notified to the driver while the output request for the collision avoidance support information exists.

On the other hand, when the output request for the collision avoidance support information does not exist (No in Step S11), in Step S13, the notification ECU 30 determines whether the output request for the vehicle-infrastructure cooperation support information exists. In this case, the notification ECU 30 determines whether the output request for the vehicle-infrastructure cooperation support information has been received. When the output request for the vehicle-infrastructure cooperation support information exists, in Step S13, the notification ECU 30 sounds the buzzer sound from the speaker 32, displays the vehicle-infrastructure cooperation support information on the display 31, and once finishes this routine. Thus, under the state in which the output request for the collision avoidance support information does not exist, while the output request for the vehicle-infrastructure cooperation support information is being received, the vehicle-infrastructure cooperation support information (only the vehicle-infrastructure cooperation support information) is notified to the driver.

Moreover, when neither the output request for the collision avoidance support information nor the output request for the vehicle-infrastructure cooperative support information exists (No in Step S13), the notification ECU 30 once finishes this routine. Thus, the collision avoidance support information and the vehicle-infrastructure cooperation support information are not notified.

In this way, in the notification arbitration control routine, the collision avoidance support information is preferentially notified to the driver when the output request for the collision avoidance support information exists irrespective of whether the output request for the vehicle-infrastructure cooperation support information exists. Thus, when the condition for notifying the vehicle-infrastructure cooperation support information (first condition of the present invention) and the condition for notifying the collision avoidance support information (second condition of the present invention) are simultaneously satisfied, the notification of the vehicle-infrastructure cooperation support information is inhibited, and the collision avoidance support information is notified.

For example, under the state in which the output request for the vehicle-infrastructure cooperation support information is received (under the state in which the first condition of the present invention is satisfied), when the output request for the collision avoidance support information is subsequently received (when the second condition of the present invention is satisfied), at a time point when the output request for the collision avoidance support information is received (Yes in Step S11), the notification ECU 30 stops the notification of the vehicle-infrastructure cooperation support information, and causes the notification of the collision avoidance support information to be started (S12).

Moreover, under the state in which the output request for the collision avoidance support information is received (under the state in which the second condition is satisfied), the notification ECU 30 does not verify the absence/presence of the output request for the vehicle-infrastructure cooperation support information. Thus, even when the output request for the vehicle-infrastructure cooperation support information is subsequently received (when the first condition of the present invention is satisfied), the ECU 30 continues the notification of the collision avoidance support information, and does not start the output request for the vehicle-infrastructure cooperation support information (S11→S12).

Figure 3:
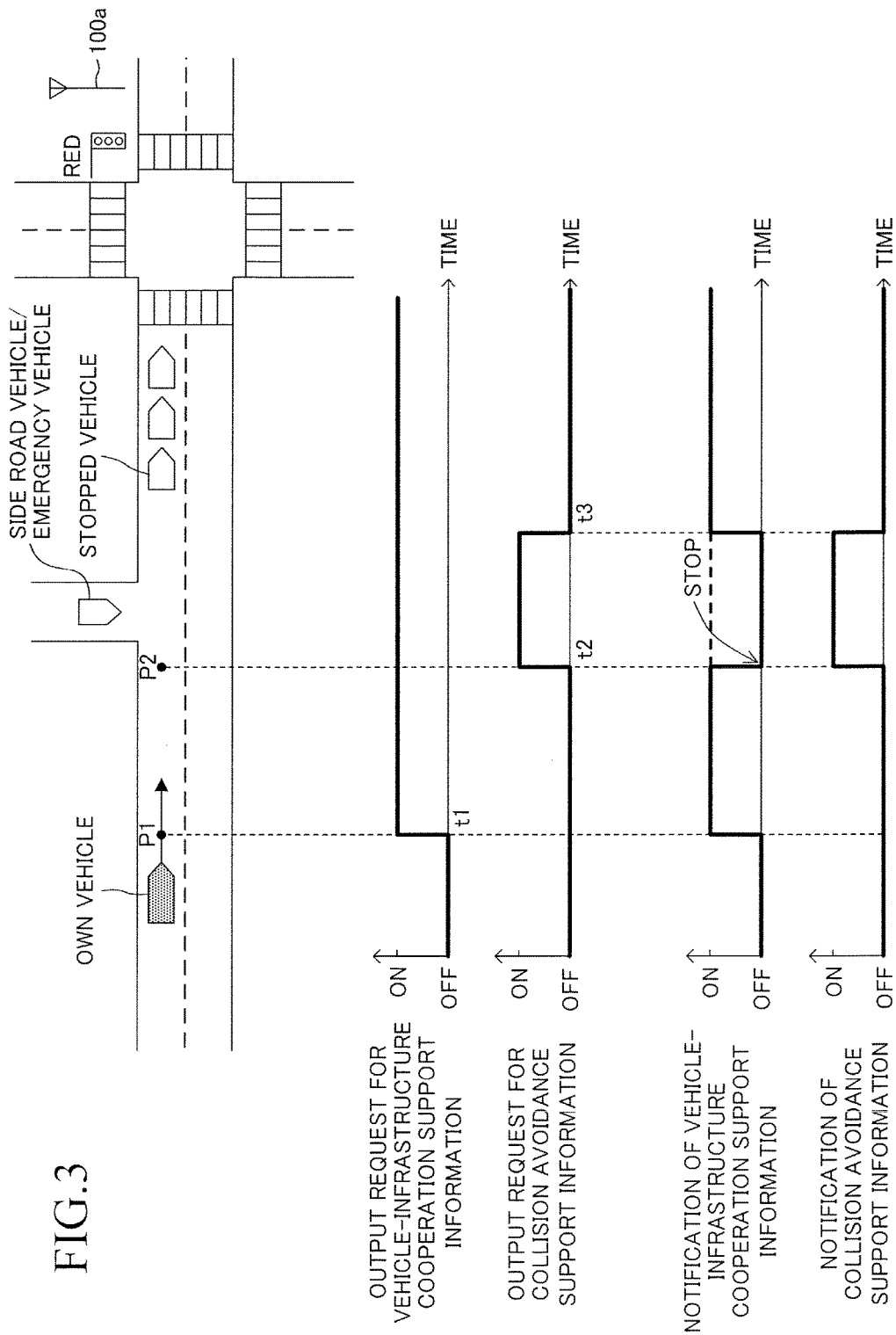
FIG. 3 is a timing chart for illustrating notification timings of vehicle-infrastructure cooperation support information and collision avoidance support information.

A specific description is now given. For example, as illustrated in FIG. 3, a case is considered in which while the own vehicle is traveling toward an intersection (intersection adapted to the vehicle-infrastructure cooperation), at a time point t1 when the own vehicle passes a travel point P1, the notification condition for the vehicle-infrastructure cooperation support information is satisfied. As the vehicle-infrastructure cooperation support information, for example, the red traffic signal overlook caution information, the temporary stop overlook caution information, the stopped preceding vehicle existence notification information, the side road vehicle existence notification information, the ecological driving support information, and the emergency vehicle approach notification information are given. In this case, at the time point t1, the vehicle-infrastructure cooperation ECU 10 transmits the output request for the vehicle-infrastructure cooperation support information to the notification ECU 30. On this occasion, the notification ECU 30 is not receiving the output request for the collision avoidance support information. Thus, the notification ECU 30 starts the notification of the vehicle-infrastructure cooperation support information from the time point t1.

Ranges represented by "ON" of a chart of the output request for the vehicle-infrastructure cooperation support information and a chart of the output request for the collision avoidance support information of FIG. 3 respectively represent a period in which the notification of the vehicle-infrastructure cooperation support information is requested and a period in which the notification of the collision avoidance support information is requested. On this occasion, a description is given on the assumption that the period in which the notification of the vehicle-infrastructure cooperation support information is being requested and a period in which the output request (traffic signal) for the vehicle-infrastructure cooperation support information is being transmitted are the same, but a period from a start of the transmission of the output request (traffic signal) for the vehicle-infrastructure cooperation support information to an elapse of a predetermined period may be set as the period in which the notification of the vehicle-infrastructure cooperation support information is requested. Similarly, on this occasion, a description is given on the assumption that the period in which the notification of the collision avoidance support information is requested and a period in which the output request (traffic signal) for the collision avoidance support information is being transmitted are the same, but a period from a start of the transmission of the output request (traffic signal) for the collision avoidance support information to an elapse of a predetermined period may be set as the period in which the notification of the collision avoidance support information is requested.

When the driver is losing attention to the forward direction, the own vehicle quickly approaches a stopped vehicle waiting for the traffic light to change. In this case, at a time point t2 when the own vehicle passes a travel point P2, the collision avoidance support ECU 40 determines that the own vehicle is highly likely to collide with the stopped vehicle (TTC≤T1), and transmits the output request for the collision avoidance support information to the notification ECU 30. Thus, the state in which the notification of the vehicle-infrastructure cooperation support information and the notification of the output request for the collision avoidance support information are simultaneously requested starts from the time point t2, but the notification ECU 30 prioritizes the notification of the collision avoidance support information. Thus, the notification ECU 30 stops the notification of the vehicle-infrastructure cooperation support information, and starts the notification of the collision avoidance support information.

Then, at a time point t3, the collision avoidance support ECU 40 stops the transmission of the output request for the collision avoidance support information. At the time point t3, when the notification ECU 30 detects the stop of the output request for the collision avoidance support information, which has been transmitted from the collision avoidance support ECU 40, the notification ECU 30 finishes the notification of the collision avoidance support information, and when the output request for the vehicle-infrastructure cooperation support information is being received, resumes the notification of the vehicle-infrastructure cooperation support information. Moreover, when the notification ECU 30 is not receiving the output request for the vehicle-infrastructure cooperation support information at the time point t3, the notification ECU 30 does not notify of the vehicle-infrastructure cooperation support information, and later starts the notification of the vehicle-infrastructure cooperation support information when the output request for the vehicle-infrastructure cooperation support information is received.

Figure 4:
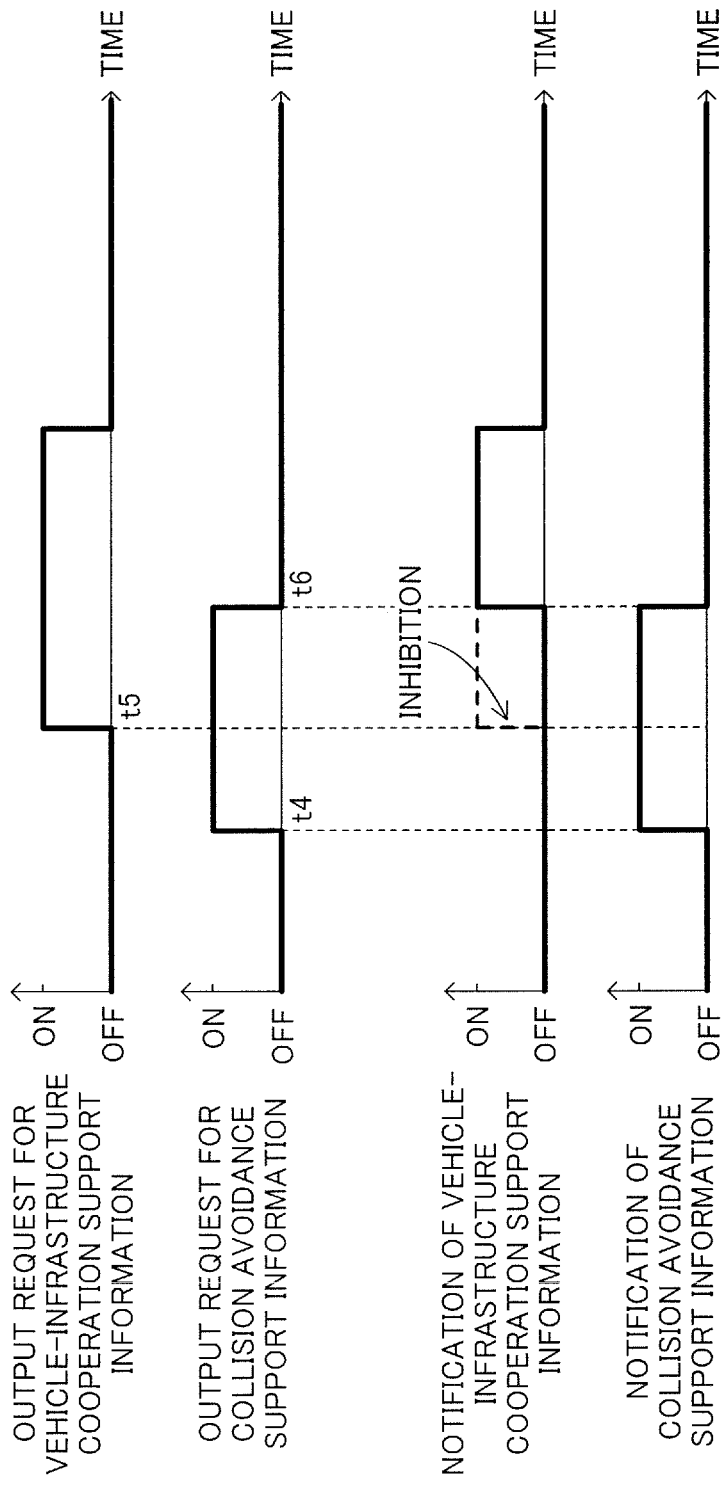
FIG. 4 is a timing chart for illustrating notification timings of the vehicle-infrastructure cooperation support information and the collision avoidance support information.

In the above-mentioned example, the output request for the collision avoidance support information is transmitted after the output request for the vehicle-infrastructure cooperation support information, but a case of an opposite sequence, namely, a case in which the output request for the vehicle-infrastructure cooperation support information is transmitted after the output request for the collision avoidance support information, is also conceivable. For example, when the driver is losing the attention to the forward direction, the own vehicle may quickly approach a preceding vehicle traveling ahead of the own vehicle. In this case, as illustrated in FIG. 4, at a time point t4 at which the collision avoidance support ECU 40 determines that the own vehicle is highly likely to collide with the preceding vehicle, the collision avoidance support ECU 40 transmits the output request for the collision avoidance support information to the notification ECU 30.

When the notification condition for the vehicle-infrastructure cooperation support information is satisfied under the state in which the notification of the collision avoidance support information is requested, at this time point t5, the vehicle-infrastructure cooperation ECU 10 transmits the output request for the vehicle-infrastructure cooperation support information. As the vehicle-infrastructure cooperation support information, for example, the side road vehicle existence notification information or the emergency vehicle approach notification information are given. Thus, the state in which the notification of the vehicle-infrastructure cooperation support information and the notification of the output request for the collision avoidance support information are simultaneously requested starts from the time point t5, but the notification ECU 30 prioritizes the notification of the collision avoidance support information. Thus, the notification ECU 30 stops the notification of the vehicle-infrastructure cooperation support information, and continues the notification of the collision avoidance support information. As a result, the notification of the vehicle-infrastructure cooperation support information does not start from the time point t5.

At a time point t6, when the output request for the collision avoidance support information is stopped, the notification ECU 30 stops the notification of the collision avoidance support information. As a result, when the notification ECU 30 is receiving the output request for the vehicle-infrastructure cooperation support information at the time point t6, the notification ECU 30 starts the notification of the vehicle-infrastructure cooperation support information. Moreover, when the notification ECU 30 is not receiving the output request for the vehicle-infrastructure cooperation support information at the time point t6, the notification ECU 30 does not notify of the vehicle-infrastructure cooperation support information, and later starts the notification of the vehicle-infrastructure cooperation support information when the output request for the vehicle-infrastructure cooperation support information is received.

In the above-mentioned example, a description is given of the case in which the output request for the vehicle-infrastructure cooperation support information is transmitted by the operation of the travel type application operating under the state in which the vehicle is traveling. The same holds true for a case in which the output request for the vehicle-infrastructure cooperation support information is transmitted by an operation of the stop type application operating under the state in which the vehicle is stopped (including a very low speed range).

Figure 5:
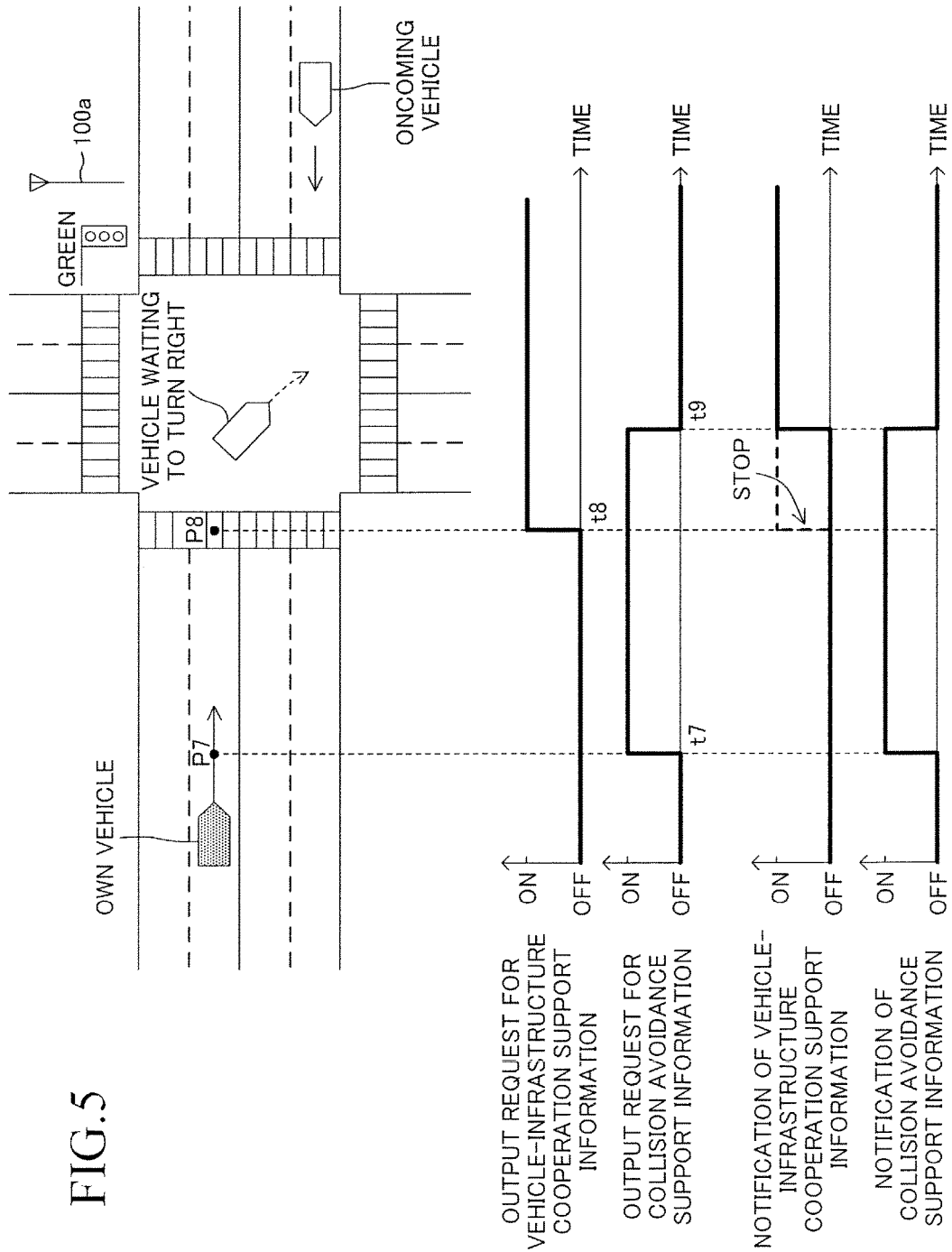
FIG. 5 is a timing chart for illustrating notification timings of the vehicle-infrastructure cooperation support information and the collision avoidance support information.

For example, as illustrated in FIG. 5, a case is considered in which while another vehicle is stopped to turn right at an intersection, the driver of the own vehicle fails to watch the front field of view, and quickly approaches another vehicle. In this case, at a time point t7 when the own vehicle passes a travel point P7, the collision avoidance support ECU 40 determines that the own vehicle is highly likely to collide with another vehicle (vehicle waiting to turn right) (TTC≤T1), and transmits the output request for the collision avoidance support information to the notification ECU 30. Thus, the notification ECU 30 starts the notification of the collision avoidance support information from the time point t7.

When an oncoming vehicle traveling toward the intersection is detected at a travel time point P8 at which the own vehicle has decelerated to enter the intersection at a predetermined speed or less, the vehicle-infrastructure cooperation ECU 10 transmits the output request for the vehicle-infrastructure cooperation support information, which is the right turn caution information, to the notification ECU 30 (time point t8). Thus, the state in which the notification of the vehicle-infrastructure cooperation support information and the notification of the collision avoidance support information are simultaneously requested starts from the time point t8, but the notification ECU 30 prioritizes the notification of the collision avoidance support information. Thus, the notification ECU 30 inhibits the notification of the vehicle-infrastructure cooperation support information, and continues the notification of the collision avoidance support information. As a result, the notification of the vehicle-infrastructure cooperation support information does not start from the time point t8.

At a time point t9, when the output request for the collision avoidance support information is stopped, the notification ECU 30 ends the notification of the collision avoidance support information. As a result, when the notification ECU 30 is receiving the output request for the vehicle-infrastructure cooperation support information at the time point t9, the notification ECU 30 starts the notification of the vehicle-infrastructure cooperation support information. In this example, when the oncoming vehicle traveling toward the intersection is detected, the notification of the vehicle-infrastructure cooperation support information (right turn caution information) is started.

On this occasion, the right turn caution information is given as the example of the vehicle-infrastructure cooperation support information requested to be output simultaneously with the collision avoidance support information, but there are cases in which the output of the other vehicle-infrastructure cooperation support information is requested. For example, a case is considered in which when the own vehicle quickly approaches another vehicle waiting for a traffic light to change ahead of the own vehicle so as to cause the request for the collision avoidance support information to be transmitted, the output request for the vehicle-infrastructure cooperation support information such as the start preparation information or the emergency vehicle approach notification information is later transmitted. In this case, similarly, unless the output request for the collision avoidance support information is finished, the notification of the vehicle-infrastructure cooperation support information is inhibited.

With the above-mentioned driving support apparatus of this embodiment, under the state in which the output request for the collision avoidance support information and the output request for the vehicle-infrastructure cooperation support information are simultaneously generated, the notification of the vehicle-infrastructure cooperation support information is inhibited, and the notification of the collision avoidance support information is given. Thus, the driver can appropriately carry out the collision avoidance operation in accordance with the notification of the collision avoidance support information without the interference by the notification of the vehicle-infrastructure cooperation support information.

<Modified Example Relating to Collision Avoidance Support>

The collision avoidance support ECU 40 of the above-mentioned embodiment is configured to detect an obstacle ahead of the vehicle through the ambient sensor 41, and determine the possibility of the collision of the own vehicle with the obstacle based on the time to collision TTC. In a modified example of the present invention, an obstacle in the vicinity of the vehicle is detected by the ambient sensor 41, and the possibility of the collision between the obstacle and the own vehicle is determined based on the distance between the own vehicle and the obstacle.

In this modified example, for example, the ambient sensor 41 includes clearance sonars respectively installed at a center portion and left and right corner portions of a front bumper in a vehicle widthwise direction, and at a center portion and left and right corner portions of a rear bumper in the vehicle widthwise direction. The clearance sonar is configured to emit an ultrasonic wave, and detect the distance from the own vehicle to the obstacle based on a reflected wave of the emitted ultrasonic wave. The detection distance of the clearance sonar is, for example, about two to three meters at the maximum. The collision avoidance support ECU 40 operates when the vehicle speed of the own vehicle becomes equal to or less than a set vehicle speed (low vehicle speed) set in advance. The collision avoidance support ECU 40 is configured to set the control mode to the no support mode when the distance (hereinafter referred to as clearance C) detected by each of the clearance sonars is more than an alarm threshold C1, and not to provide the information (collision avoidance support information) for supporting the collision avoidance of the driver.

Moreover, the collision avoidance support ECU 40 is configured to set the control mode to the alarm mode when the collision avoidance support ECU 40 determines that such an alarm condition ($C \leq C1$) that the clearance C is equal to or less than the alarm threshold C1 is satisfied. The alarm condition ($C \leq C1$) corresponds to the second condition of the present invention. This alarm condition is set to be satisfied when the possibility that the own vehicle collides with the obstacle becomes high. In the alarm mode, the collision avoidance support ECU 40 is configured to transmit the output request for the collision avoidance support information, which is the information for prompting the driver to carry out the collision avoidance operation (brake pedal depression operation), to the notification ECU 30. In this case, the collision avoidance support ECU 40 may be configured to transmit the collision avoidance support information representing a location (location of the clearance sonar) that the obstacle is approaching.

When the notification ECU 30 receives the output request for the collision avoidance support information, the notification ECU 30 is configured to sound the buzzer sound from the speaker 32, and display the alarm indication on the display 31. The alarm indication only needs to be configured to instruct the driver to immediately depress the brake pedal as in the embodiment. In this case, the notification ECU 30 may display the location that the obstacle is approaching on the display 31 for the alarm.

Moreover, when the clearance C becomes equal to or less than an automatic braking threshold C2 less than the alarm threshold C1, an automatic brake condition is satisfied, and the collision avoidance support ECU 40 sets the control mode to the automatic brake mode. The collision avoidance support ECU 40 is configured to transmit an automatic brake command representing a required braking force set in advance to the brake ECU 50 in the automatic brake mode. The brake ECU 50 is configured to control the operation of the brake actuator 51 in accordance with the automatic brake command. The collision avoidance support ECU 40 is configured to transmit the output request for the collision avoidance support information to the notification ECU 30 also in the automatic brake mode as in the alarm mode.

Figure 6:
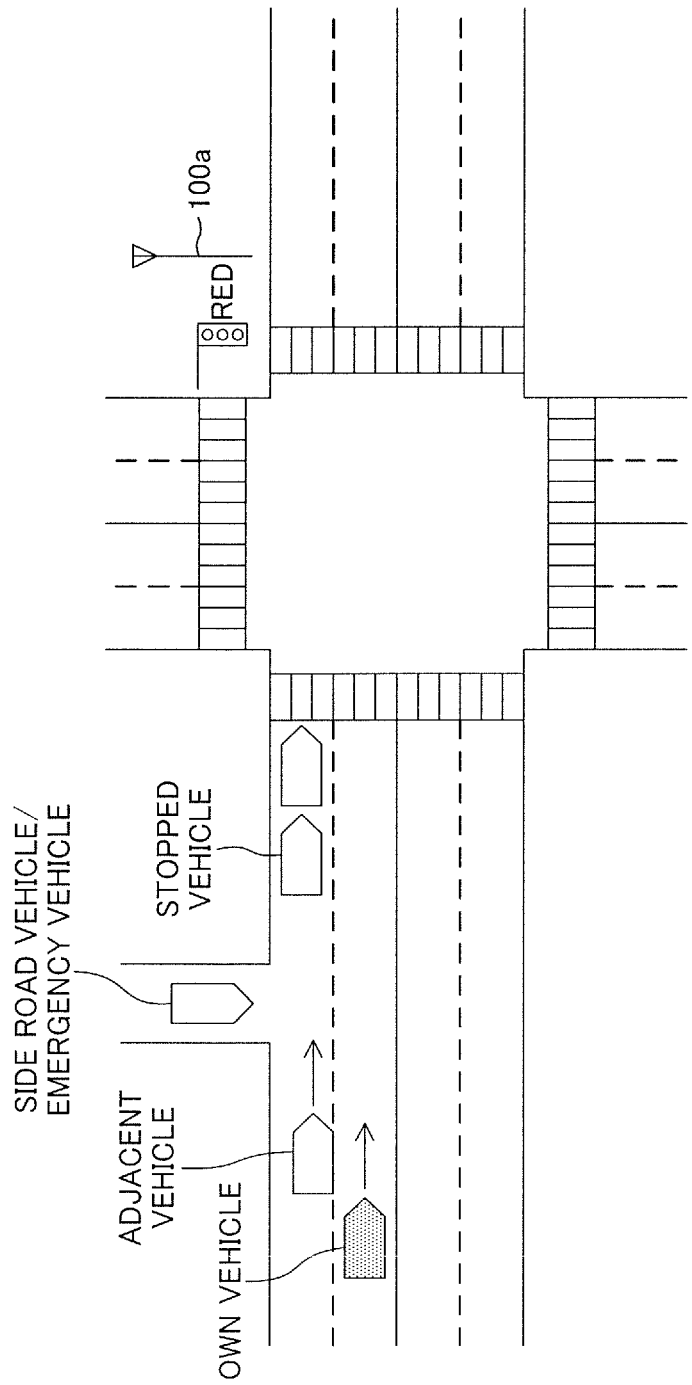
FIG. 6 is an explanatory diagram for illustrating a state in which an output request for the vehicle-infrastructure cooperation support information and an output request for the collision avoidance support information are simultaneously generated according to a modified example of the present invention.

For example, as illustrated in FIG. 6, when the own vehicle approaches an adjacent vehicle traveling in an adjacent travel lane while traveling toward an intersection at low speed, and the clearance C becomes equal to or less than the alarm threshold C1, the collision avoidance support ECU 40 transmits the output request for the collision avoidance support information to the notification ECU 30. When the own vehicle is traveling in a vicinity of the intersection, as described above, the travel type application of the vehicle-infrastructure cooperation ECU 10 operates, and the output request for vehicle-infrastructure cooperation support information (such as the red traffic signal overlook caution information, the temporary stop overlook caution information, the stopped preceding vehicle existence notification information, the side road vehicle existence notification information, the ecological driving support information, and the emergency vehicle approach notification information) may be transmitted from the vehicle-infrastructure cooperation ECU 10 to the notification ECU 30.

Figure 7:
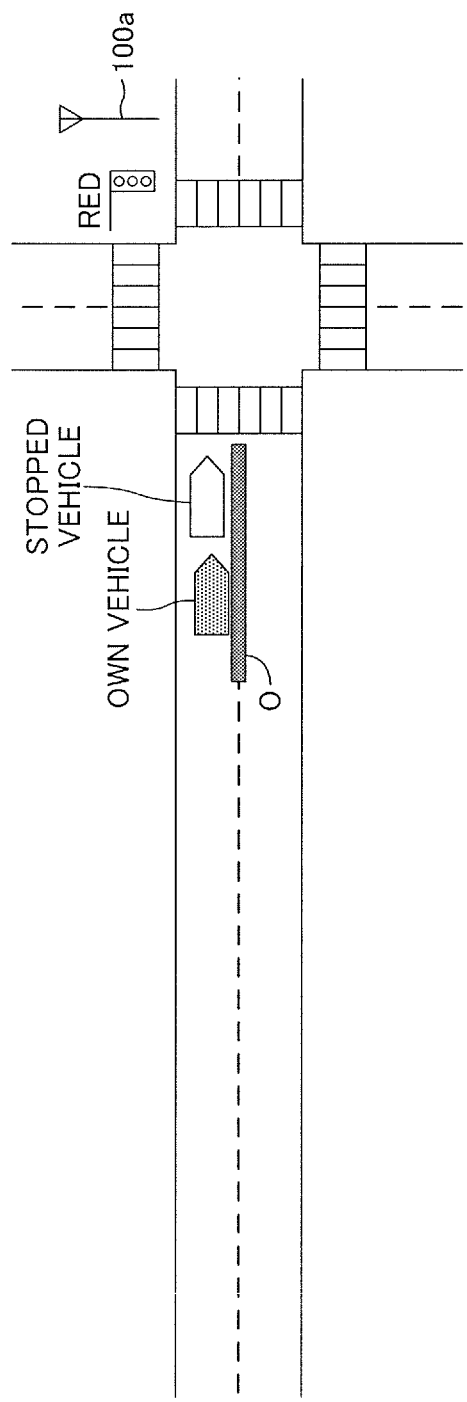
FIG. 7 is an explanatory diagram for illustrating a state in which the output request for the vehicle-infrastructure cooperation support information and the output request for the collision avoidance support information are simultaneously generated according to the modified example.

Moreover, for example, as illustrated in FIG. 7, also in a case in which the own vehicle approaches a stopped vehicle waiting for the traffic light to change at an intersection and stops, and the clearance C to the stopped vehicle is equal to or less than the alarm threshold C1 or in a case in which the stop position of the own vehicle is close to a structure O such as a fence, and the clearance C to the structure O is equal to or less than the alarm threshold C1, the collision avoidance support ECU 40 transmits the output request for the collision avoidance support information to the notification ECU 30. In this case, the stop type application of the vehicle-infrastructure cooperation ECU 10 operates, and the output request for the vehicle-infrastructure cooperation support information (such as the right turn caution information, the start preparation information, and the emergency vehicle approach notification information) may be transmitted from the vehicle-infrastructure cooperation ECU 10 to the notification ECU 30.

Thus, the state is generated in which the output request for the collision avoidance support information and the output request for the vehicle-infrastructure cooperation support information are simultaneously transmitted to the notification ECU 30.

Also in this modified example, the notification ECU 30 executes the notification arbitration control routine (FIG. 2). Thus, the notification arbitration control routine notifies the driver of the collision avoidance support information preferentially when the output request for the collision avoidance support information exists irrespective of whether the output request for the vehicle-infrastructure cooperation support information exists. Consequently, under the state in which the output request for the collision avoidance support information and the output request for the vehicle-infrastructure cooperation support information are simultaneously generated, the notification of the vehicle-infrastructure cooperation support information is inhibited, and the notification of the collision avoidance support information is given. As a result, the driver can appropriately carry out the collision avoidance operation in accordance with the notification of the collision avoidance support information without the interference by the notification of the vehicle-infrastructure cooperation support information.

In the above, the driving support apparatus according to this embodiment has been described, but the present invention is not limited to the above-mentioned embodiment, and various changes are possible within the range not departing from the object of the present invention.

For example, in this embodiment, the vehicle-infrastructure cooperation ECU 10 is configured to receive the infrastructure information (externally transmitted information) including both the vehicle detection information and the traffic light information, and, based on the infrastructure information and the own vehicle information (the position information on the own vehicle and the driving state information on the own vehicle), give the notification for the driving support. However, the vehicle-infrastructure cooperation ECU 10 may receive any one of the vehicle detection information and the traffic light information. In this case, the vehicle-infrastructure cooperation ECU 10 only needs to generate the vehicle-infrastructure cooperation support information that can be used to support the driving from the received information, and only needs to notify the driver of the information. For example, when the vehicle-infrastructure cooperation ECU 10 is configured to receive the traffic light information as the infrastructure information, the vehicle-infrastructure cooperation ECU 10 can notify the driver of the red traffic signal overlook caution information, the start preparation information, and the like. Moreover, when the vehicle-infrastructure cooperation ECU 10 is configured to receive the vehicle detection information as the infrastructure information, the vehicle-infrastructure cooperation ECU 10 can notify the driver of the right turn caution information, the stopped preceding vehicle existence notification information, the side road vehicle existence notification information, the emergency vehicle approach notification information, and the like.

What is claimed is:

1. A driving support apparatus, comprising:
   obstacle detection means comprising a sensor installed on an own vehicle, for detecting an obstacle existing at least ahead of the own vehicle; and
   one or more electronic control units configured for:
   acquiring externally transmitted information transmitted from a communication device external to the own vehicle, the externally transmitted information comprising at least one of vehicle detection information on another vehicle detected in a vicinity of the own vehicle, or traffic light information on lighting of a traffic light installed in the vicinity of the own vehicle;
   acquiring own vehicle information representing a position and a driving state of the own vehicle;
   giving a first notification for driving support while a first condition, which is a condition based on the externally transmitted information and the own vehicle information, and is a condition that necessitates provision of the driving support for a driver, is satisfied and a second condition that the own vehicle is highly likely to collide with the detected obstacle is not satisfied;
   giving a second notification of prompting the driver to carry out a collision avoidance operation while the second condition is satisfied; and
   inhibiting the first notification from being given and giving the second notification while the first condition and the second condition are simultaneously satisfied, until the second condition is no longer satisfied, and giving the first notification while the first condition continues to be satisfied and the second condition is not satisfied.

2. The driving support apparatus according to claim 1, wherein the one or more electronic control units is configured to, when the second condition is satisfied under a state in which the first condition is satisfied before the second condition, stop the first notification when the second condition is satisfied, and start the second notification.

3. The driving support apparatus according to claim 2, wherein the one or more electronic control units is configured to, when the first condition is satisfied under a state in which the second condition is satisfied before the first condition, continue the second notification, and be inhibited from starting the first notification.

4. The driving support apparatus according to claim 1, wherein the one or more electronic control units is configured to, when the first condition is satisfied under a state in which the second condition is satisfied before the first condition, continue the second notification, and be inhibited from starting the first notification.

* * * * *